US012460828B2

(12) United States Patent
Seibold (10) Patent No.: US 12,460,828 B2
(45) Date of Patent: Nov. 4, 2025

(54) DEVICE FOR EXCHANGING THERMAL ENERGY WITH AMBIENT AIR AND HEAT PUMP WITH A DEVICE OF THIS TYPE

(71) Applicant: Andreas Seibold, Kernen (DE)

(72) Inventor: Andreas Seibold, Kernen (DE)

( * ) Notice: Subject to any disclaimer, the term of this patent is extended or adjusted under 35 U.S.C. 154(b) by 0 days.

(21) Appl. No.: 18/881,880

(22) PCT Filed: Jul. 10, 2023

(86) PCT No.: PCT/EP2023/069076
§ 371 (c)(1),
(2) Date: Jan. 7, 2025

(87) PCT Pub. No.: WO2024/013113
PCT Pub. Date: Jan. 18, 2024

(65) Prior Publication Data
US 2025/0264231 A1 Aug. 21, 2025

(30) Foreign Application Priority Data
Jul. 12, 2022 (DE) ...................... 10 2022 117 317.8

(51) Int. Cl.
*F24F 1/18* (2011.01)
*F24F 1/38* (2011.01)
(Continued)

(52) U.S. Cl.
CPC .................. *F24F 1/18* (2013.01); *F24F 1/38* (2013.01); *F24F 1/50* (2013.01); *F24F 13/20* (2013.01); *F24F 13/24* (2013.01)

(58) Field of Classification Search
CPC ........ F24F 1/18; F24F 1/38; F24F 1/50; F24F 13/20; F24F 13/24; F28F 2250/08; F04D 29/4226
See application file for complete search history.

(56) References Cited

U.S. PATENT DOCUMENTS

| 2020/0191432 A1* | 6/2020 | Bauch | ...................... F24F 13/24 |
| 2021/0048201 A1* | 2/2021 | Choi | ...................... F24F 1/0087 |
| 2021/0048238 A1* | 2/2021 | Fujiwara | ................. F25B 41/00 |

FOREIGN PATENT DOCUMENTS

| CN | 104612990 A | 5/2015 | |
| CN | 110056969 A * | 7/2019 | ............ F24F 1/0057 |

(Continued)

OTHER PUBLICATIONS

Pdf is translation of oreign reference CN 110056969 A (Year: 2019).*

(Continued)

*Primary Examiner* — Len Tran
*Assistant Examiner* — Kamran Tavakoldavani
(74) *Attorney, Agent, or Firm* — David Guerra (57) ABSTRACT

A device for exchanging thermal energy with ambient air including a heat exchanger, a fan arranged downstream for conveying air flow through the heat exchanger, and an air supply unit with at least one air inlet opening and an air discharge unit with an air outlet opening for discharging the air flow out of the fan into the environment. The air inlet opening and the air outlet opening are arranged on the same side of the device. The air supply unit has a supply air channel feeding into the heat exchanger, which extends along an inlet surface of the heat exchanger and continuously tapers along the inlet surface, and the outflow cross-section, defining the outlet speed of the air flow, of the air outlet opening is smaller than the inflow cross-section, defining the inlet speed of the air flow, of the at least one air inlet opening.

19 Claims, 9 Drawing Sheets

(51) Int. Cl.
   *F24F 1/50*   (2011.01)
   *F24F 13/20*  (2006.01)
   *F24F 13/24*  (2006.01)

(56)            References Cited

FOREIGN PATENT DOCUMENTS

| EP | 3907407 A1 | * | 11/2021 | ......... F04D 29/4226 |
|----|------------|---|---------|------------------------|
| JP | S5770029 U |   | 4/1982  |                        |
| JP | 2012207819 A |  | 10/2012 |                        |
| KR | 20030036581 A | | 5/2003  |                        |
| KR | 100540272 B1 | | 1/2006  |                        |

OTHER PUBLICATIONS

Pdf is original document of foreign reference EP 3907407 A1 (Year: 2021).*

* cited by examiner

FIG.10

DEVICE FOR EXCHANGING THERMAL ENERGY WITH AMBIENT AIR AND HEAT PUMP WITH A DEVICE OF THIS TYPE

CROSS-REFERENCE TO RELATED APPLICATIONS

This application is an U.S. national phase application under 35 U.S.C. § 371 based upon International Application No. PCT/EP2023/069076 filed on Jul. 10, 2023. Additionally, this U.S. national phase application claims the benefit of priority of International Application No. PCT/EP2023/069076 filed on Jul. 10, 2023 and German Application No. 10 2022 117 317.8 filed on Jul. 12, 2022. The entire disclosures of the prior applications are incorporated herein by reference. The international application was published on Jan. 18, 2024 under Publication No. WO 2024/013113 A1.

BACKGROUND

Technical Field

The invention relates to a device for exchanging thermal energy with ambient air, comprising a heat exchanger through which an air flow can flow, at least one fan, arranged downstream of the heat exchanger, which has an impeller with blades that can rotate about an axis of rotation for conveying the air flow through the heat exchanger, and an air supply unit with at least one air inlet opening for supplying the air flow from the environment to the heat exchanger, and an air discharge unit with at least one air outlet opening for discharging the air flow from the at least one fan into the environment, wherein the at least one air inlet opening and the at least one air outlet opening are arranged on the same side of the device.

Furthermore, the invention relates to a heat pump with such a device.

BACKGROUND DESCRIPTION

Devices of the type mentioned above are used, for example, in air conditioning systems and heat pumps, wherein the heat exchanger can function as an evaporator to absorb thermal energy from the ambient air or as a condenser to release thermal energy to the ambient air. Heat pumps are often positioned outside buildings or also in basements. However, installation outside buildings requires a corresponding amount of space, and installation in basements requires long supply and exhaust air channels which are associated with corresponding flow losses that impair the energy efficiency of the heat pumps. To counteract these disadvantages, heat pumps are often sunk into the ground outside of buildings or on an outer wall inside of buildings. However, this requires a compact design of the heat pumps and requires the positioning of the at least one air inlet opening and the at least one air outlet opening on the same side of the heat pump, wherein the risk exists of the air flow flowing out of the at least one air outlet opening flowing back to the at least one air inlet opening such that a thermal short circuit is formed, and consequently the energy efficiency is also impaired.

SUMMARY

The object of the present invention is therefore to develop a device and a heat pump of the type mentioned at the outset in such a way that it has improved energy efficiency.

This object is achieved according to the invention in a device of the generic type in that the air supply unit has at least one supply air channel, feeding into the heat exchanger, which extends along an inlet surface of the heat exchanger and continuously tapers along the inlet surface, and in that the outflow cross-section, defining the outlet speed of the air flow, of the at least one air outlet opening is smaller than the inflow cross-section, defining the inlet speed of the air flow, of the at least one air inlet opening.

In the device according to the invention, the air flow is supplied to the heat exchanger via at least one supply air channel feeding into the heat exchanger, wherein it extends along an inlet surface, which can be exposed to the air flow, of the heat exchanger and continuously tapers along the inlet surface. Due to the successive entry of the air flow into the heat exchanger, the volume flow of the air flow within the supply air channel decreases in the flow direction along the inlet surface. In order to compensate for the gradually decreasing volume flow, the at least one supply air channel continuously tapers along the inlet surface in the direction of flow. As a result, the air flow is guided over the entire inlet region at a practically constant flow speed while avoiding dead spots, so that the flow losses impairing energy efficiency can be kept to a minimum.

The air flow is discharged to the environment via at least one air outlet opening which is arranged on the same side of the device as the at least one air inlet opening. In order to avoid a backflow of the air flow from the at least one air outlet opening to the at least one air inlet opening, the outflow cross-section, defining the outlet speed of the air flow, of the at least one air outlet opening is smaller than the inflow cross-section, defining the inlet speed of the air flow, of the at least one air inlet opening. The smaller outflow cross-section results in an outlet speed of the air flow that is greater than the inlet speed of the air flow. This counteracts a backflow of the air flow and therefore a thermal short circuit impairing energy efficiency. The device according to the invention is therefore distinguished by high energy efficiency, wherein flow losses can be kept low, and there is practically no mixing of the outgoing air flow with the incoming air flow.

It is advantageous if the outflow cross-section, defining the outlet speed of the air flow, of the at least one air outlet opening is a maximum of 0.8 times, in particular a maximum of 0.7 times, that of the inflow cross-section, defining the inlet speed of the air flow, of the at least one air inlet opening. The smaller the outflow cross-section defining the outlet speed, the greater the outlet speed of the air flow. The air flow is therefore virtually ejected from the device so that there is practically no mixing with the incoming air flow.

In an advantageous embodiment of the invention, the heat exchanger is plate-shaped. It can be provided in this regard for the inlet surface of the heat exchanger to be designed, for example, to be rectangular.

Alternatively, it can be provided that the heat exchanger be designed to be L-shaped and have a first leg and a second leg. The two legs are aligned at an angle to each other—for example, at an angle of about 90°. The inlet surface of the heat exchanger extends over both legs, wherein the L-shaped design gives the heat exchanger a very compact construction.

It can be provided that the device have a supply air channel which extends over both legs of the heat exchanger. The air flow can therefore be supplied to the inlet surfaces of both legs via the supply air channel, wherein the supply air channel continuously tapers along the inlet surfaces of both legs in order to thereby supply the air flow via the inlet surfaces at a practically constant speed.

Alternatively, it can be provided that the device have two supply air channels that each extend over one of the two legs. The supply air channels, each extending along one of the inlet surfaces of the legs, taper continuously along the inlet surfaces and therefore supply the air flow to the heat exchanger at a practically constant speed across the inlet surface.

In the case of an L-shaped design of the heat exchanger, it is advantageous if the device has a fan whose axis of rotation is inclined to the surface normal of one of the two legs of the heat exchanger in the direction of the other leg. This supports the even and low-loss flow through the heat exchanger over both legs. In particular, it can be provided that the axis of rotation be oriented in the direction of the transition area between the two legs.

In a preferred embodiment of the invention, the two legs of the heat exchanger are designed to be different in length, and the axis of rotation is inclined to the surface normal of the longer leg in the direction of the shorter leg. Such an inclination of the axis of rotation yields a particularly low-loss flow through the heat exchanger.

It is advantageous if the axis of rotation of the at least one fan is inclined to a surface normal of the heat exchanger in the direction of an end region of a supply air channel. Such an inclination of the axis of rotation supports the even and low-loss flow through the heat exchanger.

In an advantageous embodiment of the invention, the at least one supply air channel tapers in a wedge shape along the inlet surface of the heat exchanger. For example, it can be provided that the at least one supply air channel have wall sections inclined at an angle to the vertical in a horizontal position of use of the device.

In a preferred embodiment of the invention, at least one fan is designed as an axial fan, to which an outflow housing is assigned, which receives the air flow conveyed by the axial fan on the outflow side and which has a housing outlet opening through which the air flow can flow in a tangential direction with respect to a swirl movement imposed on the air flow under the effect of the rotating blades of the impeller of the axial fan. Axial fans enable a particularly even flow through the heat exchanger.

However, axial fans have the disadvantage that the conveyed volume flow decreases even with a moderate increase in back pressure. For this reason, axial fans often have a free outflow, without obstructions. In order to be able to position the at least one air outlet opening on the same side of the device as the at least one air inlet opening, it is, however, advantageous to divert the air flow upstream and downstream of the axial fan by 90° in each case. In order to keep the pressure losses caused by the deflection to a minimum, in a preferred embodiment of the device according to the invention, when using an axial fan, the swirl of the air flow caused by the rotating blades of the impeller of the axial fan is utilized for low-loss deflection. For this purpose, the air flow conveyed by the axial fan is received on the downstream side by an outflow housing, the housing outlet opening of which is positioned in such a way that the air flow can flow through it in a tangential direction with respect to the swirl movement. Due to the swirl imposed by the axial fan, the air flow within the outflow housing executes a movement around the fan axis of rotation and is supplied to the housing outlet opening in a tangential direction. This creates a parallel flow in the region of the housing outlet opening, which evenly fills the entire cross-section of the housing outlet opening, with the air flow showing hardly any residual swirl. The air flow downstream of the axial fan is therefore deflected with minimal flow losses.

It is advantageous if the outflow housing forms an air intake chamber, axially offset from the impeller and from a motor of the axial fan rotating the impeller about the axis of rotation, which receives the conveyed air flow over the entire cross-section of the impeller and the motor and is penetrated by the axis of rotation, wherein the outflow housing covers the impeller and the motor like a hood in a rear view. The air flow conveyed by the axial fan can therefore be received by the outflow housing over a large area and consequently with low losses across the entire cross-section of the impeller and the motor.

Preferably, the housing outlet opening of the outflow housing is arranged downstream of the axial fan in a region, laterally offset from a center plane of the axial fan, of the outflow housing, wherein the center plane is aligned coaxially with the axis of rotation of the axial fan, and wherein the blades of the impeller rotate in this laterally offset region in a rear view of the outflow housing towards the housing outlet opening. In a rear view of the outflow housing looking along the axis of rotation, the center plane of the axial fan, aligned coaxially with the axis of rotation, divides the impeller into two halves. The housing outlet opening is arranged downstream of the axial fan on that side of the center plane on which the blades of the impeller rotate when rotating about the axis of rotation in the rear view of the outflow housing towards the housing outlet opening. As a result, the air flowing on this side of the center plane moves substantially in a tangential direction to the housing outlet opening, and the air flowing on the opposite side of the center plane moves in a looping motion towards the housing outlet opening. This creates a parallel flow in the housing outlet opening, which evenly fills practically the entire cross-section of the housing outlet opening and has practically no residual swirl.

When using a large-area heat exchanger, it is advantageous if the device has a plurality of fans that are arranged next to each other.

In particular, it can be provided that the device have two axial fans, each of which is assigned an outflow housing which receives the air flow conveyed by the respective axial fan, wherein the housing outlet openings of the outflow housings feed into a common air outlet channel of the air discharge unit.

It is advantageous if the two axial fans and the associated outflow housings are designed identically, wherein the outflow housings have a different rotational position with respect to the respective fan axis of rotation so that their housing outlet openings are inclined towards each other, in order to supply the conveyed air flows to the common air outlet channel with low loss.

It can be provided that at least one fan be designed as a radial fan which is surrounded by a spiral housing which receives the air flow, conveyed by the radial fan, on the downstream side and which has a housing outlet opening through which the air flow can flow in a tangential direction relative to the rotational movement of the impeller of the radial fan. Radial fans have the advantage that the conveyed volume flow hardly decreases even with a moderate increase in back pressure. In order to achieve a low-loss deflection of the air flow, in an advantageous embodiment of the invention, the air flow conveyed by the radial fan is guided in a tangential direction through the housing outlet opening of the spiral housing surrounding the radial fan in the circumferential direction.

It can be provided that an air inlet channel be arranged upstream of the at least one supply air channel. The air inlet channel can have several channel sections that are connected to each other in a flow-tight manner to prevent leakage flows. The air inlet channel can, for example, have an air inlet nozzle and/or a bend.

In an advantageous embodiment of the invention, an air outlet channel is arranged downstream of the at least one fan. The air outlet channel can have several channel sections that are connected to each other in a flow-tight manner to prevent leakage flows. The air outlet channel can, for example, comprise a pipe bend and/or an air outlet nozzle.

It is advantageous if at least one end region of the air outlet channel continuously tapers in the direction of flow in order to thereby increase the flow speed of the air flow.

In order to reduce the noise emission of the device, the air discharge unit has a silencer in a preferred embodiment of the invention. In this regard, it can be provided that the silencer define the outflow cross-section.

The silencer is preferably designed as a splitter silencer which has a housing, wherein a plurality of spaced-apart baffles are arranged between two opposite side walls of the housing at a distance from the side walls, wherein the outflow cross-sections between the baffles, and between the baffles and the side walls, as a whole form the outflow cross-section defining the outlet speed of the air flow. In such an embodiment, the air flow is guided between the baffles to reduce noise emissions. The outflow cross-section, which defines the outlet speed of the air flow, is formed by the totality of the outflow cross-sections arranged between adjacent baffles and between the baffles and the side walls.

To expand the air flow, in a preferred embodiment of the invention, the air discharge unit has a first diffuser with an opening angle of a maximum of 8°, wherein the outlet cross-section of the diffuser forms the outflow cross-section defining the outlet speed of the air flow. To prevent a detachment of the air flow from the wall of the first diffuser, the opening angle of the first diffuser is a maximum of 8°.

In an advantageous embodiment of the invention, a second diffuser, which is designed to form a free jet, is arranged downstream of the first diffuser. In particular, it can be provided that the opening angle of the second diffuser be at least 90°—for example, 140°. The second diffuser can be connected directly to the first diffuser. In such an embodiment, an edge at which the air flow leaves to form a free jet is formed between the two diffusers. The outlet cross-section of the first diffuser forms the outflow cross-section which defines the outlet speed of the air flow, whereas the second diffuser and in particular its outlet cross-section has no noticeable influence on the outlet speed of the air flow due to the formation of the free jet at the edge between the two diffusers.

As already mentioned at the beginning, the invention also relates to a heat pump. In order to design the heat pump in such a way that it has improved energy efficiency, the heat pump comprises a device of the type described above.

The heat pump can, for example, be designed as an underfloor heat pump that is embedded in a floor slab or sunk into the ground.

It can also be provided that the heat pump be able to be positioned on an outer wall of a building room, wherein the at least one air inlet opening and the at least one air outlet opening are arranged in the outer wall.

BRIEF DESCRIPTION OF THE DRAWINGS

The following description of advantageous embodiments of the invention serves to explain in more detail in conjunction with the drawing. In the figures.

Figure 1:
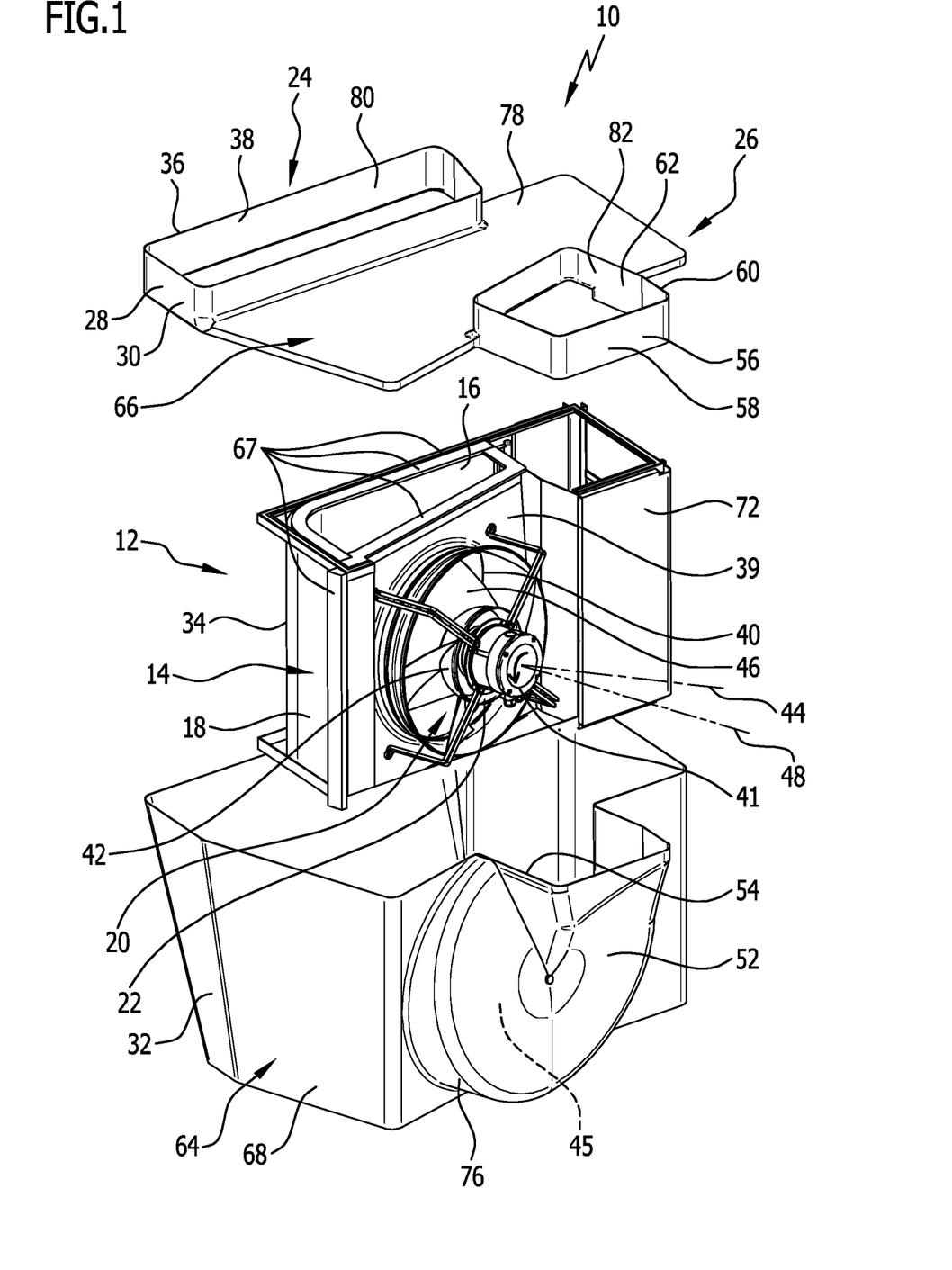
FIG. 1 shows an exploded view drawing of a first advantageous embodiment of a heat pump according to the invention with a first advantageous embodiment of a device according to the invention for exchanging thermal energy with the ambient air.
Figure 2:
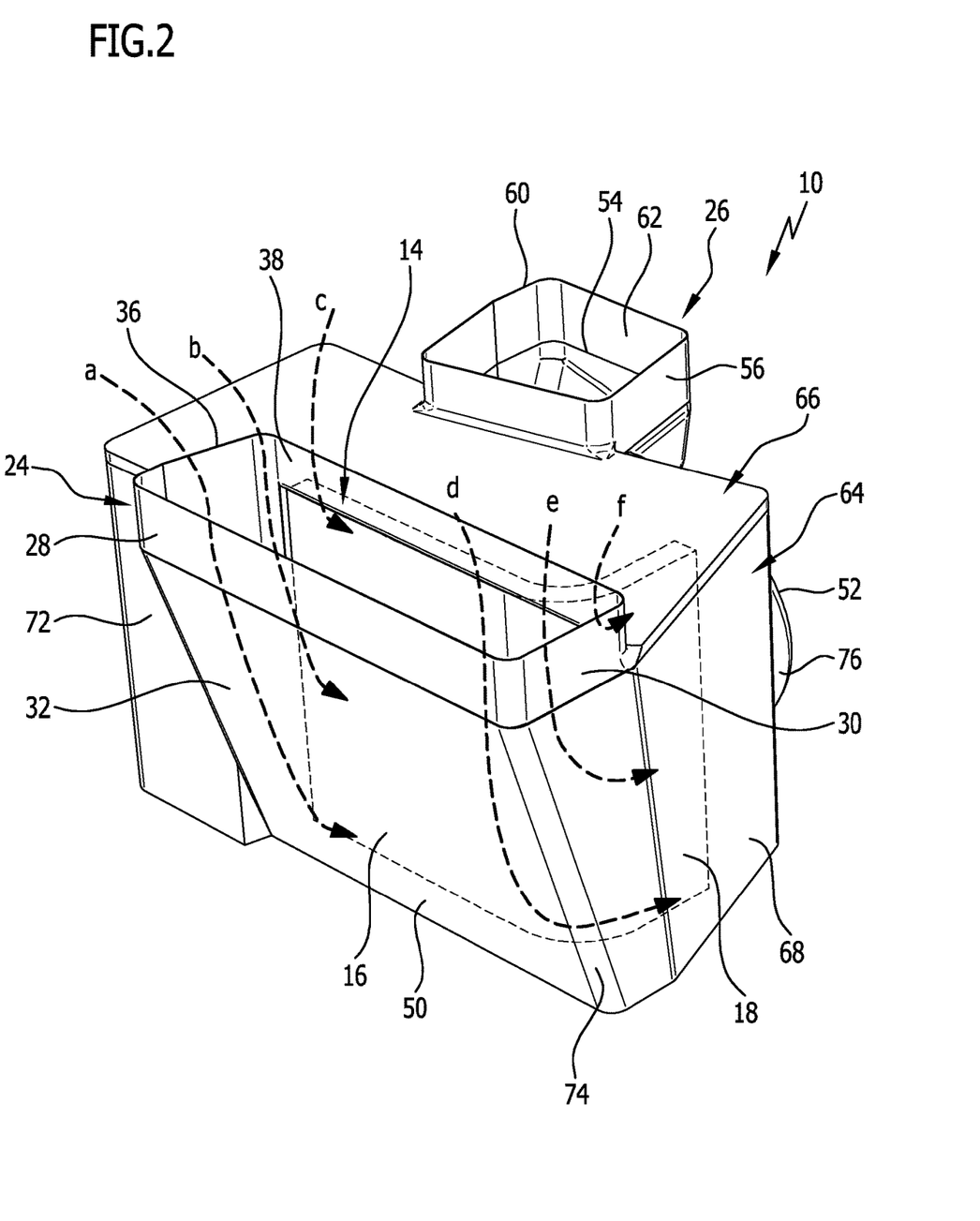
FIG. 2 shows a perspective view of the heat pump from FIG. 1.

FIGS. 1 and 2 schematically show a first advantageous embodiment of a heat pump 10 according to the invention, which has a first advantageous embodiment of a device according to the invention for exchanging thermal energy with the ambient air. The device as a whole is designated by reference sign 12.

The device 12 has a flat heat exchanger 14 which is L-shaped in plan view with a flat first leg 16 also designed to be flat and a flat second leg 18 adjoining the first leg 16.

DETAILED DESCRIPTION OF THE EMBODIMENTS

In order to convey an air flow through the heat exchanger 14, the device 12 has a fan 20, arranged downstream of the heat exchanger 14 at a distance therefrom, which is designed as an axial fan 22 in the shown embodiment. Upstream of the heat exchanger 14, the device 12 has an air supply unit 24 for supplying the air flow from the environment to the heat exchanger 14, and, downstream of the axial fan 22, the device 12 has an air discharge unit 26 for discharging the air flow to the environment.

The air supply unit 24 has an air inlet channel 28 which forms an air inlet nozzle 30, to which a supply air channel 32, in the flow direction of the air flow, is directly connected which tapers in a wedge shape in the flow direction and extends along an inlet surface 34 of the heat exchanger 14, which can be acted upon by the air flow. The inlet surface 34 extends over the first leg 16 and the second leg 18, so that the air flow can be supplied to both legs via the air inlet nozzle 30 and the supply air channel 32. The air inlet nozzle 30 has a circumferential inlet edge 36 facing away from the supply air channel 32, which edge surrounds an air inlet opening 38 of the air supply unit 24 in the circumferential direction.

The axial fan 22 is held on a bulkhead 39 which has a penetration 40. The axial fan 22 has a motor 41 which causes an impeller 42 to rotate about an axis of rotation 44. The impeller 42 has blades 46. Under the action of the rotating blades 46, the air flow downstream of the axial fan 22 is subjected to a swirling motion around the axis of rotation 44. The bulkhead 39 separates the inflow side of the axial fan 22 from its outflow side to prevent internal backflow.

The axis of rotation 44 is inclined to a surface normal 48 of the first leg 16 in the direction of the second leg 18 and in the direction of an end region 50, facing away from the air inlet nozzle 30, of the supply air channel 32. This supports the uniform flow through the heat exchanger 14 over its entire inlet surface 34.

The air discharge unit 26 has, downstream of the axial fan 22, an outflow housing 52 which is designed in the manner of a hood which forms an air intake chamber 45, axially offset from the impeller 42 and the motor 41, and through which the axis of rotation 44 passes. In a rear view looking along the axis of rotation 44, the outflow housing 52 covers the impeller 42 and the motor 41, the motor axis (not shown in the drawing) of which is aligned coaxially with the axis of rotation 44. The outflow housing 52 receives the air flow conveyed by the axial fan 22 over a large region across the entire cross-section of the impeller 42 and the motor 41. The outflow housing 52 has a housing outlet opening 54 to which an air outlet channel 56 in the form of an air outlet nozzle 58 is connected in the flow direction of the air flow. The air outlet nozzle 58 has an air outlet edge 60, facing away from the housing outlet opening 54, which surrounds an air outlet opening 62 in the circumferential direction. The air flow can be released into the environment via the air outlet opening 62.

In a rear view of the outflow housing 52, the housing outlet opening 54 is arranged above one half of the blades 46, wherein the blades 46 rotates on this half towards the housing outlet opening 54 so that the air flow can be supplied to the housing opening 54 in a tangential direction by utilizing the swirling movement of the air flow caused by the rotating blades 46. This will be explained in more detail below with reference to the third advantageous embodiment shown schematically in FIG. 4.

The heat pump 10 can be sunk into the ground and for this purpose has a trough-shaped housing 64 which is closed by a cover 66 that can be placed on the housing 64. The cover 66 sits on the top of the heat exchanger 14 and the bulkhead 39 in a flow-tight manner with the interposition of sealing elements 67.

The housing 64 has a central housing section 68 which accommodates the heat exchanger 14, the bulkhead 39, and the axial fan 22. In addition, the middle housing section 68 accommodates a hydraulic housing 72, which is arranged laterally next to the first leg 16 of the heat exchanger 14 and laterally next to the bulkhead 39 and the axial fan 22, and accommodates the hydraulic components of the heat pump 10, in particular a compressor, a condenser, and an expansion valve.

The hydraulic components are known to a person skilled in the art and are not shown in the drawing to provide a better overview.

Upstream of the middle housing section 68, the trough-shaped housing 64 has a front housing section 74 which forms the supply air channel 32, and, downstream of the middle housing section 68, the trough-shaped housing 64 has a rear housing section 76 which forms the outflow housing 52.

The cover 66 has a cover plate 78 covering the central housing section 68 and forms the air inlet nozzle 30 and the air outlet nozzle 58 which are integrally connected to the cover plate 78.

The supply air channel 32 extends along the inlet surface 34 and feeds into the heat exchanger, wherein the flow cross-section of the supply air channel 32 continuously decreases along the inlet surface and therefore compensates for the steadily decreasing volume flow due to the successive entry of the air into the heat exchanger. This results in the air flow being supplied to the heat exchanger 14 at a practically constant speed over the entire inlet surface 34, while avoiding dead zones. The practically constant speed over the entire inlet surface 34 reduces any flow losses of the air flow. The flow conditions within the supply air channel 32 are shown schematically in FIG. 2 using exemplary flow lines a, b, c, d, e, and f.

The inlet speed of the air flow into the air supply unit 24 is defined by the inflow cross-section of the entry surface 80 of the air inlet opening 38, surrounded in the circumferential direction by the entry edge 36 of the air inlet nozzle 30, and the outlet speed of the air flow from the air discharge unit 26 is defined by the outflow cross-section of the exit surface 82 of the air outlet opening 62 surrounded in the circumferential direction by the air outlet edge 60 of the air outlet nozzle 58. The outflow cross-section is significantly smaller than the inflow cross-section. In the shown embodiment, the outflow cross-section is approximately half the size of the inflow cross-section. This means that the outlet speed of the air flow is significantly higher than the inlet speed of the air flow. The higher outlet speed ensures that the exiting air flow practically does not mix with the incoming air flow, and a thermal short circuit is therefore avoided, although the air outlet opening 62 is arranged on the same side of the device 10, viz., its top side, as the air inlet opening 38.

The heat pump 10 and the device 12 are therefore distinguished by a high energy efficiency, wherein flow losses of the air flow can be kept low despite the deflection of the air flow by a total of 180°.

Figure 3:
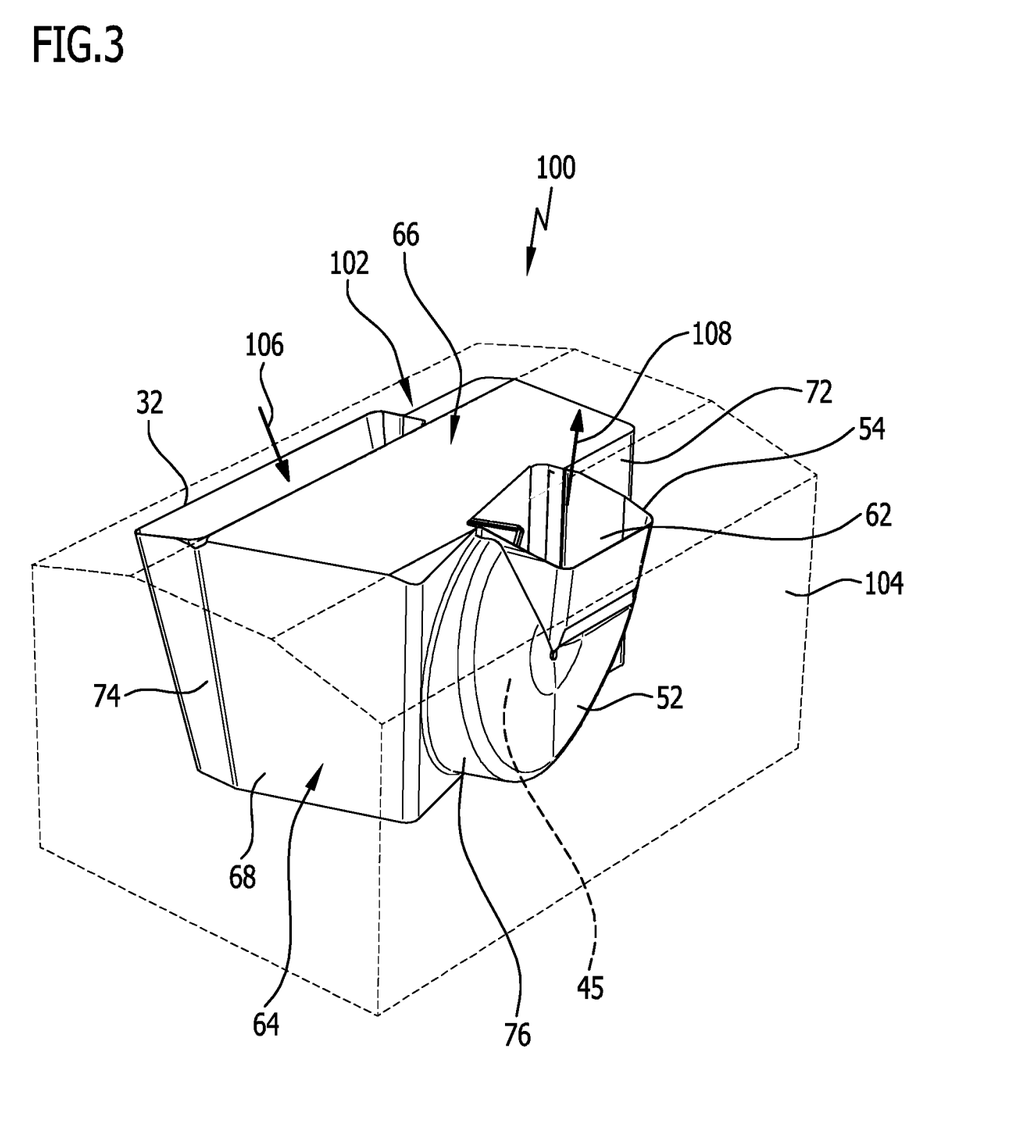
FIG. 3 shows a perspective view of a second advantageous embodiment of a heat pump with a second advantageous embodiment of a device for exchanging thermal energy with the ambient air.

FIG. 3 schematically shows a second advantageous embodiment of a heat pump 100 according to the invention, which has a second advantageous embodiment of a device according to the invention for exchanging thermal energy with the ambient air, which is designated by reference sign 102. FIG. 3 shows an installation situation in which the heat pump 100 is sunk into an earth volume 104. The heat pump 100 and the device 102 are designed largely identically to the heat pump 10 and the device 12 shown above with reference to FIGS. 1 and 2. For identical components, the same reference signs are therefore used in FIG. 3 as in FIGS. 1 and 2, and with regard to these components, reference is made to the preceding explanations in order to avoid repetition.

The heat pump 100 and the device 102 differ from the heat pump 10 and the device 12 only in that the air inlet nozzle 30 and the air outlet nozzle 58 are omitted so that the air flow from the environment can enter directly into the supply air channel 32 and can exit directly into the environment via the housing outlet opening 54 of the outflow housing 52. The air supply unit 24 is therefore formed by the supply air channel 32, and the air discharge unit 26 is formed by the outflow housing 52. The inlet cross-section of the supply air channel 32 forms the inflow cross-section which defines the inlet speed of the air flow, and the outlet cross-section of the housing outlet opening 54 forms the outflow cross-section which defines the outlet speed of the air flow. The incoming air flow is illustrated in FIG. 3 by the arrow 106, and the outgoing air flow is illustrated by the arrow 108, wherein the respective lengths of the arrows 106, 108 represent the average flow speed of the incoming air flow 106 and the outgoing air flow 108, respectively. It is clear that the outlet speed is significantly greater than the inlet speed such that, despite the arrangement of the air inlet opening and the air outlet opening on the top of the heat pump 100 and the device 102, a mixing of the two air flows and therefore a thermal short circuit is avoided.

Figure 4:
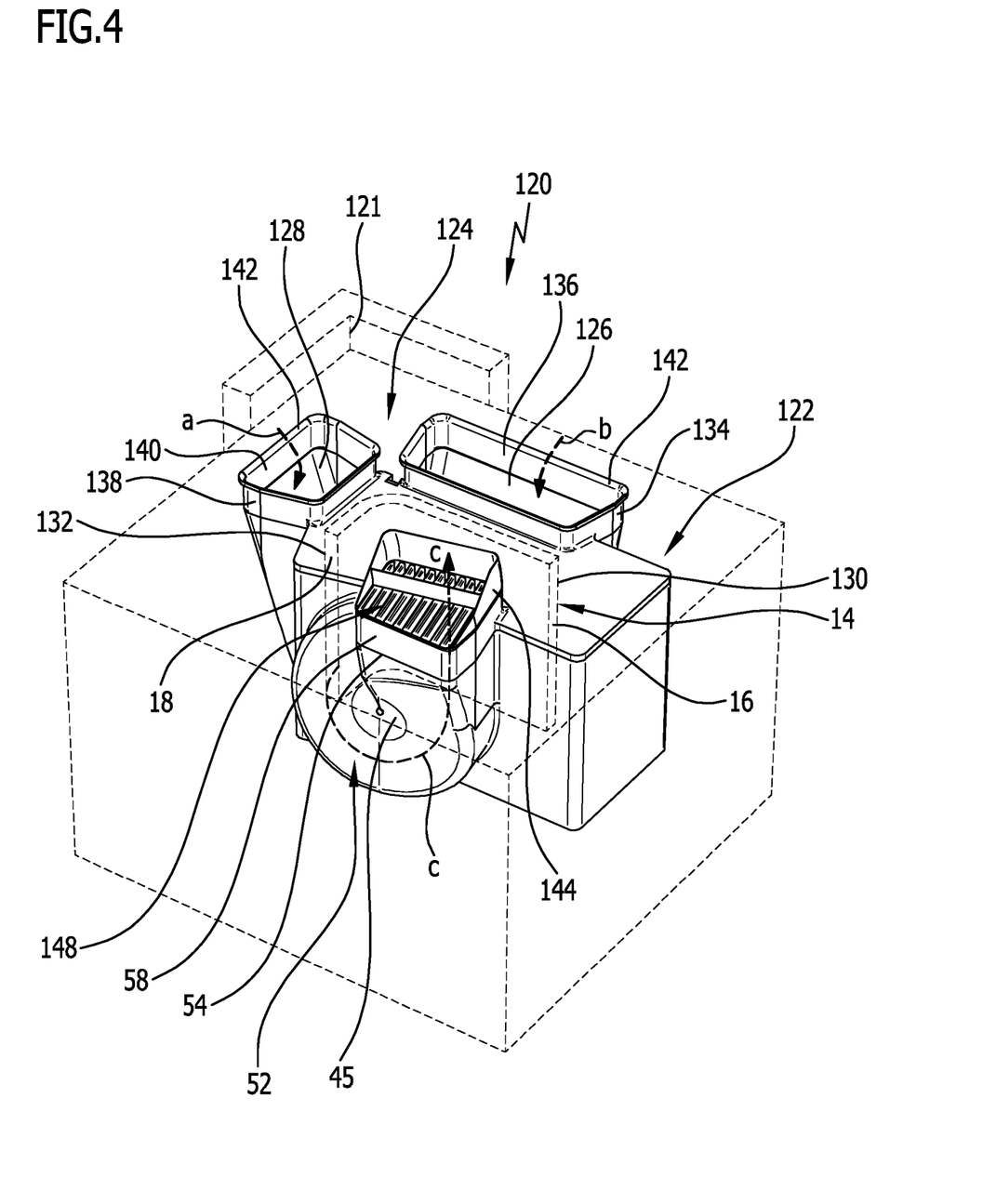
FIG. 4 shows a third advantageous embodiment of a heat pump with a third advantageous embodiment of a device for exchanging thermal energy with the ambient air.

FIG. 4 schematically shows a third advantageous embodiment of a heat pump 120 according to the invention, which has a third advantageous embodiment of a device according to the invention for exchanging thermal energy with the ambient air, wherein the device as a whole is designated by reference sign 122.

Also in FIG. 4, the same reference signs as in FIGS. 1 and 2 are used for identical components, and, with regard to these components, reference is made to the preceding explanations in order to avoid repetition.

FIG. 4 shows an installation situation of the heat pump 120 in which the heat pump 120 is sunk into the ground laterally next to a wall corner 121, shown in dashed lines, of a building. The device 122 has an air supply unit 124 with a first supply air channel 126 and a second supply air channel 128, wherein the first supply air channel 126 extends along the inlet surface 130 of the first leg 16 of the heat exchanger 14, and wherein the second supply air channel 128 extends along the inlet surface 132 of the second leg 18 of the heat exchanger 14. The two supply air channels 126, 128 taper in a wedge shape along the respective inlet surface 130, 132 and therefore ensure a practically constant speed while avoiding dead spots across the inlet surfaces 130, 132.

A first air inlet channel 134 in the form of a first air inlet nozzle 136 is arranged directly upstream of the first supply air channel 126, and a second air inlet channel 138 in the form of a second air inlet nozzle 140 is arranged directly upstream of the second supply air channel 128. The two air inlet nozzles 136, 140 each have, on their inlet edge facing away from the respective supply air channel 126 or 128, a rounding 142, which ensures a separation-free inflow of the air flow. The air inlet nozzles 136, 140 in combination with the supply air channels 126, 128 form the air supply unit 124. The inlet edges of the air inlet nozzles 136, 140 each form an air inlet opening. The inflow cross-sections of the air inlet openings define the inlet speed of the air flow.

In the embodiment shown in FIG. 4, the air outlet nozzle 58 is followed by a bend 144 with a guide plate 146, with the aid of which the outgoing air flow is directed in the direction away from the wall corner 121.

Figure 5:
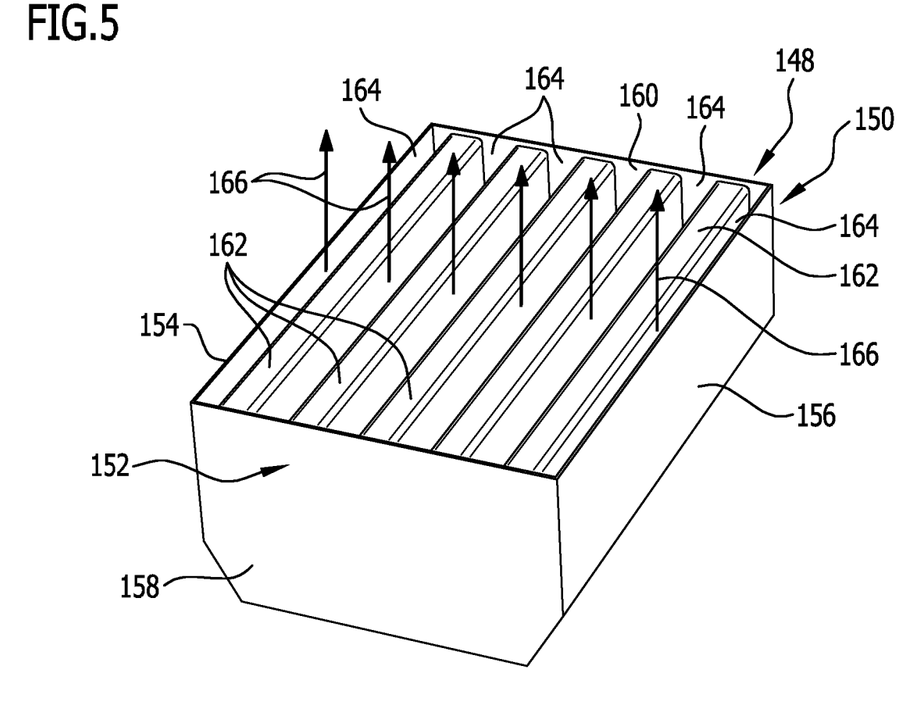
FIG. 5 shows a perspective view of a silencer of the device from FIG. 4.

A silencer 148, which is shown simplified in FIG. 5, is inserted into the air outlet nozzle 58 of the device 122. The silencer 148 is designed in the form of a splitter silencer 150 which has a housing 152. The housing 152 has two opposite side walls 154, 156 which are connected to each other via an end wall 158 and a rear wall 160. Between the two side walls 154, 156, a plurality of baffles 162 of the splitter silencer 150 extend from the front wall 158 to the rear wall 160. The baffles 162 are spaced apart from each other and from the side walls 154, 156, and between themselves and the side walls 154, 156 form outflow cross-sections 164 through which the air flow can flow. The sum of the outflow cross-sections 164 forms the outflow cross-section which defines the outlet speed of the air flow. The exiting air flow is illustrated in FIG. 5 by the arrows 166.

FIG. 4 schematically shows two examples of flow lines a, b of the air flow entering from the environment via the first air inlet nozzle 136 and the second air inlet nozzle 140 into the first supply air channel 126 and the second supply air channel 128, respectively. In addition, FIG. 4 schematically shows an example of a flow line c of the exiting air flow. The flow line c shows the tangential deflection of the air flow within the outflow housing 52 by utilizing the swirl movement around the axis of rotation 44 caused by the axial fan 22. For this purpose, the housing outlet opening 54 of the outflow housing 52 and the air outlet nozzle 58 adjoining the housing outlet opening 54 are arranged in a rear view looking along the axis of rotation 44 above that half of the impeller 42 whose blades rotate towards the housing outlet opening 54. As a result, the air flowing from this half of the impeller is conveyed to the housing outlet opening 54 with almost no deflection. The air flowing from the other half of the impeller 42, on the other hand, executes a loop-shaped movement. As a result, a parallel flow arises in the region of the housing outlet opening 54 and the air outlet nozzle 58, which has hardly any residual swirl. This allows a low-loss deflection of the air flow downstream of the axial fan 22 by 90°.

Figure 6:
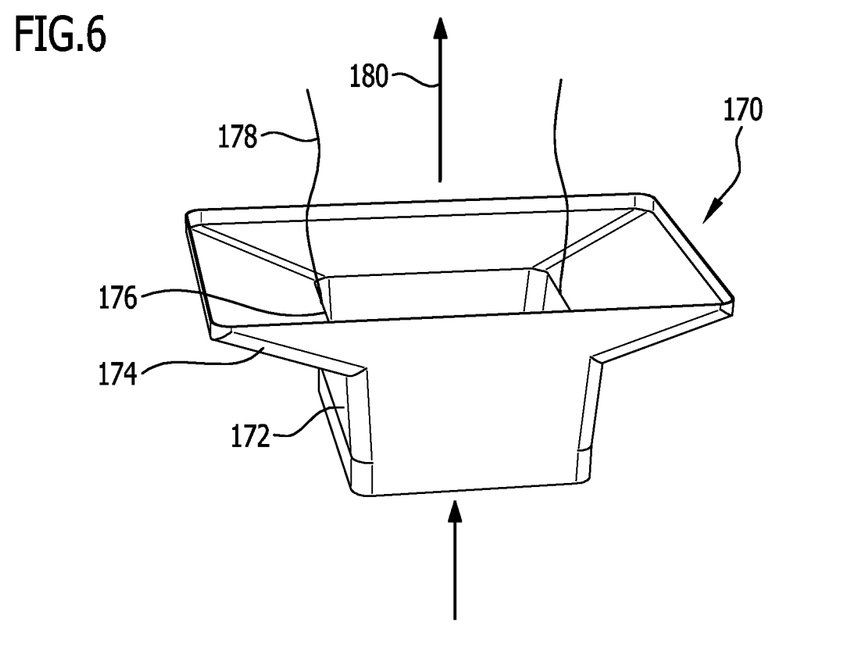
FIG. 6 shows a perspective view of an air outlet channel which forms a first diffuser and a second diffuser immediately adjacent to the first diffuser.

FIG. 6 schematically shows an air outlet channel 170 which is formed by a first diffuser 172 and a second diffuser 174 immediately adjacent thereto in the direction of flow. The opening angle of the first diffuser is a maximum of 8°. According to general knowledge in fluid mechanics, this represents the maximum opening angle for expanding a subsonic flow without separation, while slowing it down and recovering static pressure. The second diffuser 174 connecting to the first diffuser 172 via an edge 176 has an opening angle which results in the formation of a free jet of the air flow. The opening angle of the second diffuser 174 in the illustrated embodiment is at least 90°—for example, 140°. The free jet is illustrated by the wavy line 178, and the flow direction and the flow speed of the air flow are illustrated by the arrows 180. The outflow cross-section, which defines the outlet speed of the air flow, is predetermined by the outlet cross-section of the first diffuser 172, whereas the design of the second diffuser 174 and in particular its outlet cross-section has no influence on the outlet speed, due to the formation of the free jet 178.

Figure 7:
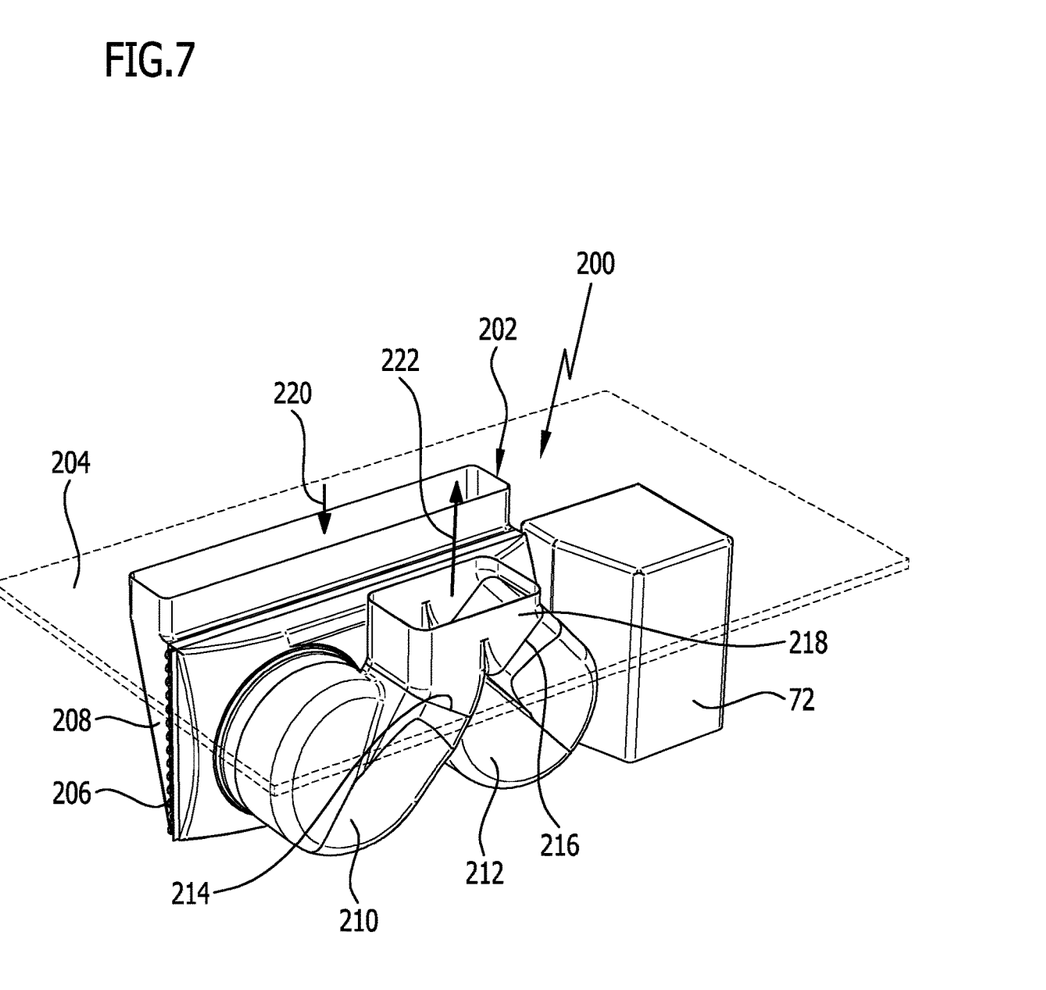
FIG. 7 shows a perspective view of a fourth embodiment of a heat pump with a fourth embodiment of a device for exchanging thermal energy with the ambient air.

FIG. 7 schematically shows a fourth advantageous embodiment of a heat pump 200 according to the invention, which has a fourth advantageous embodiment of a device according to the invention for exchanging thermal energy with the ambient air, wherein the device is designated by reference sign 202. The heat pump 200 is installed as an underfloor heat pump in a floor slab 204 and, for a high transfer of thermal energy, has a very wide heat exchanger 206, to which, via a wedge-shaped supply air channel 208, an air flow from the environment can be supplied which is generated by two identically designed axial fans arranged next to one another, each of which is followed by an outflow housing 210 or 212. The outflow housings 210, 212 are designed identically to the outflow housing 52 already explained above, but they have a different rotational position in relation to their respective axis of rotation, such that their respective housing outlet openings 214, 216 face each other and feed into a common air outlet channel 218, via which the air flow is released into the environment. The direction and speed of the incoming air flow are illustrated by the arrow 220 in FIG. 7, and the direction and speed of the outgoing air flow are illustrated by the arrow 222. The two air flows 220, 222 are aligned antiparallel to each other, wherein the significantly higher speed of the outgoing air flow 222 ensures that it does not mix with the incoming air flow 220 and form a thermal short circuit.

Figure 8:
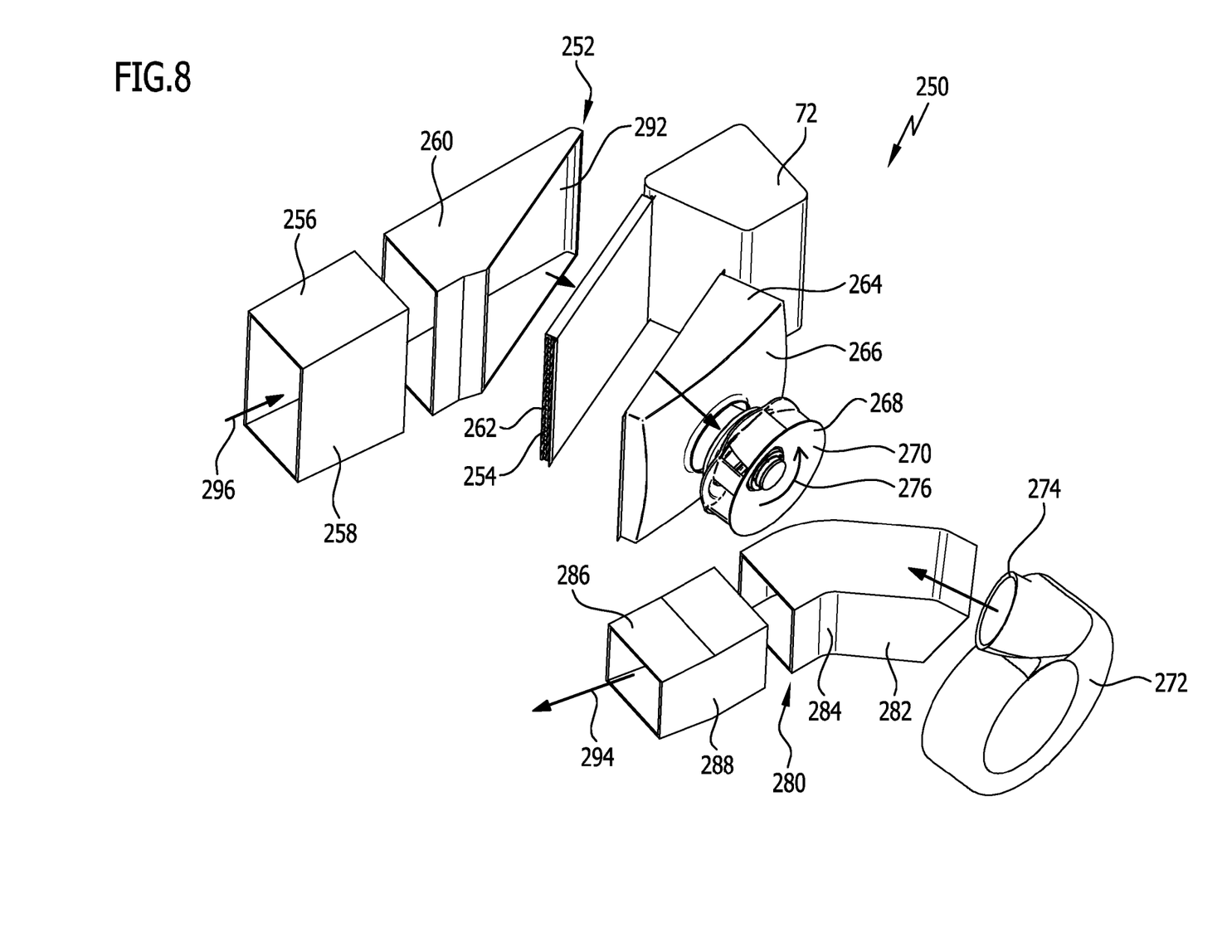
FIG. 8 shows an exploded view drawing of a fifth embodiment of a heat pump with a fifth embodiment of a device for exchanging thermal energy with the ambient air.
Figure 9:
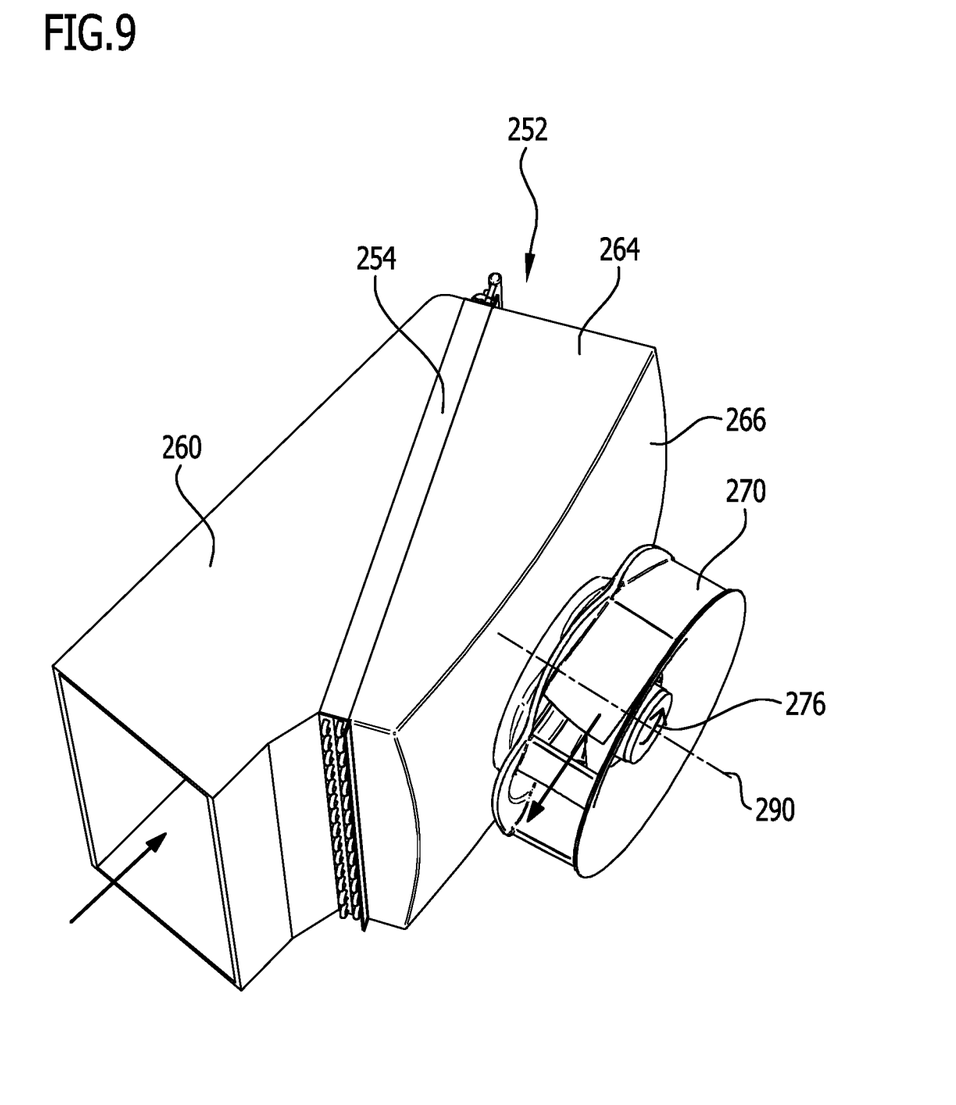
FIG. 9 shows a partial perspective view of the device from FIG. 8.
Figure 10:
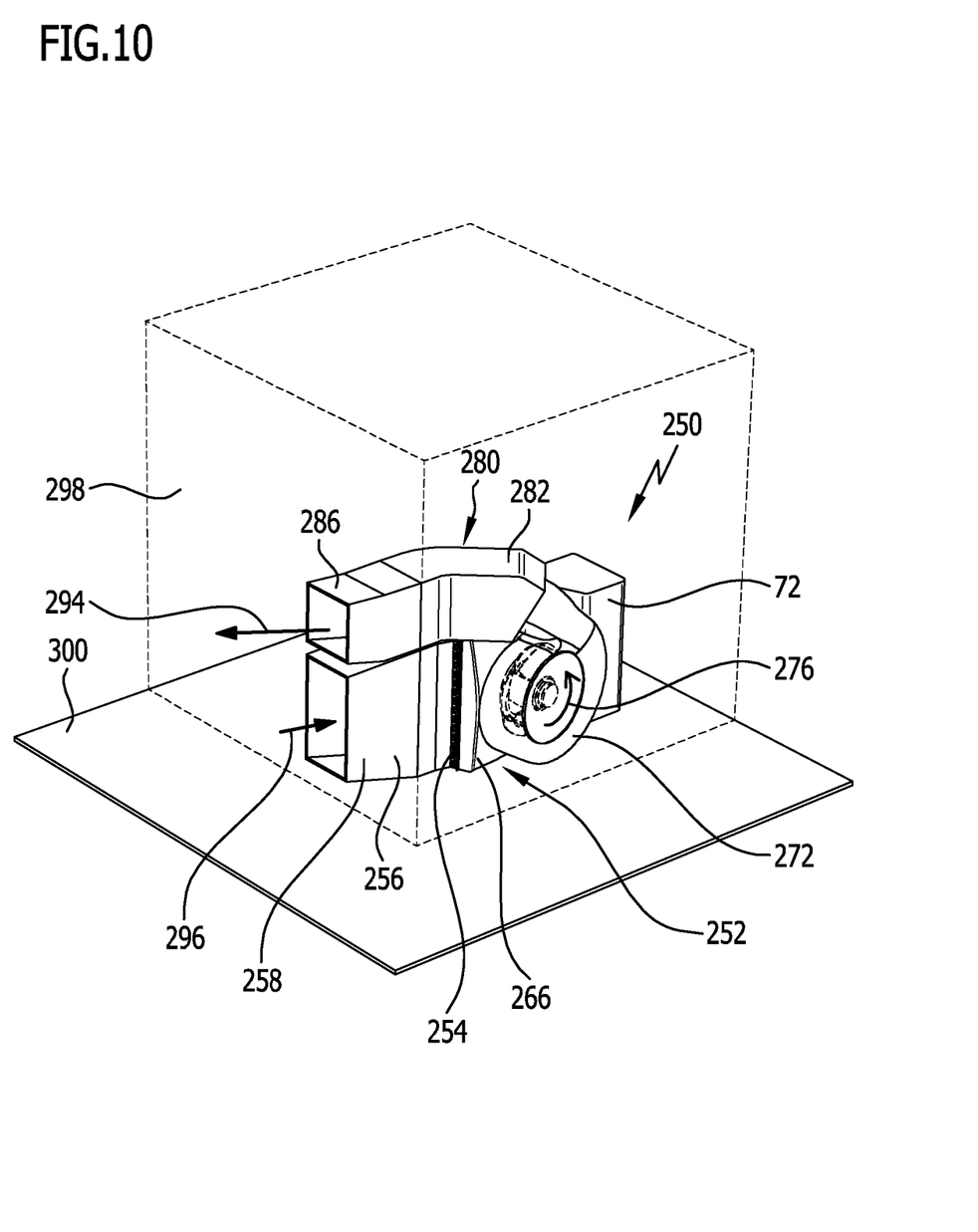
FIG. 10 shows a perspective view of the heat pump from FIG. 8.

FIGS. 8, 9, and 10 schematically show a fifth advantageous embodiment of a heat pump 250, which has a fifth embodiment of an advantageous device for exchanging thermal energy with the ambient air, wherein the device is designated by reference sign 252. The device 252 has a plate-shaped heat exchanger 254 to which an air flow can be supplied via an air inlet channel 256 in the form of an air inlet nozzle 258 and a supply air channel 260 tapering in the direction of flow in a wedge shape, wherein the supply air channel 260 extends and tapers along the entire inlet surface 262 of the heat exchanger 254.

On the downstream side, the heat exchanger 254 is connected to a hood 264 which forms an arched bulkhead 266 on which a fan 268 in the form of a radial fan 270 is held.

The radial fan 270 is surrounded in the circumferential direction by a spiral housing 272 which receives the air flow, conveyed by the radial fan 270, on the downstream side and which has a housing outlet opening 274 through which the air flow flows in a tangential direction relative to the rotary movement of the impeller of the radial fan 270 illustrated by the arrow 276 in FIGS. 8 and 10. This is particularly evident from FIG. 8.

An air outlet channel 280 is connected to the spiral housing 272 in the flow direction of the air flow, which has a first channel section 282 in the form of a bend 284 and a second channel section 286 in the form of an air outlet nozzle 288.

The uniform impingement of the inlet surface 262 of the heat exchanger 254 is achieved by the wedge-shaped design of the supply air channel 260. The axis of rotation 290 of the radial fan 270 is aligned obliquely to the flat inlet surface 262 of the heat exchanger 254 and inclined in the direction of an end region 292, facing away from the air inlet nozzle 258, of the supply air channel 260. This supports the uniform impingement of air on the heat exchanger 254 and counteracts flow losses of the air flow.

The inlet of the air inlet nozzle 258 forms the air inlet opening, and the inflow cross-section of the inlet defines the inlet speed of the air flow. The outlet of the air outlet nozzle 288 forms the air outlet region, and the outflow cross-section of the outlet defines the outlet speed of the air flow. The air inlet surface and the air outlet surface are arranged on the same side of the device 252. The outflow cross-section defining the outlet speed is significantly smaller than the inflow cross-section defining the inlet speed of the air flow, so that the outgoing air flow illustrated by the arrow 294 has a significantly higher speed than the incoming air flow illustrated by the arrow 296. Despite the arrangement of the air inlet surface and the air outlet surface on the same side of the device 252, a backflow of the outgoing air flow to the air inlet opening and therefore a thermal short circuit is avoided due to the significantly higher speed of the outgoing air flow.

FIG. 10 shows an installation situation of the heat pump 250, wherein the latter is arranged in a technical room 298 of a building on a floor 300, and the air inlet nozzle 258 and the air outlet nozzle 288 arranged above the air inlet nozzle 258 pass through an outer wall of the technical room 298.

The invention claimed is:

1. A device for exchanging thermal energy with ambient air environment, the device comprising:
   a heat exchanger through which an air flow flows;
   at least one axial fan arranged downstream of the heat exchanger, the axial fan having an impeller rotatable about an axis of rotation with blades for conveying the air flow through the heat exchanger
   an outflow housing assigned to the axial fan, which receives the air flow conveyed by the axial fan on an outflow side of the axial fan, the outflow housing having a housing outlet opening through which the air flow can flow in a tangential direction with respect to a swirl movement imposed on the air flow under an effect of the rotating blades of the impeller of the axial fan;
   an air supply unit with at least one air inlet opening for supplying the air flow from the environment to the heat exchanger; and
   an air discharge unit with at least one air outlet opening for discharging the air flow out of the axial fan to the environment;
   wherein the at least one air inlet opening and the at least one air outlet opening are arranged on a same side of the device;
   wherein the air supply unit has at least one supply air channel feeding to the heat exchanger, which extends along an inlet surface of the heat exchanger and continuously tapers along the inlet surface; and
   wherein an outflow cross-section, defining an outlet speed of the air flow, of the at least one air outlet opening is smaller than an inflow cross-section, defining an inlet speed of the air flow, of the at least one air inlet opening.

2. The device according to claim 1, wherein the outflow cross-section, defining the outlet speed of the air flow, of the at least one air outlet opening is a maximum of 0.8 times the inflow cross-section, defining the inlet speed of the air flow, of the at least one air inlet opening.

3. The device according to claim 1, wherein the heat exchanger is plate-shaped.

4. The device according to claim 1, wherein the heat exchanger is L-shaped and has a first leg and a second leg.

5. The device according to claim 4, wherein the supply air channel extends over the first leg and the second leg of the heat exchanger.

6. The device according to claim 4, wherein the supply air channel is two supply air channels that each extend over one of the first leg or the second leg.

7. The device according to claim 4, wherein the axis of rotation of the axial fan is inclined to a surface normal of one of the first leg or the second leg in a direction of the other leg.

8. The device according to claim 7, wherein the first leg and the second leg of the heat exchanger are different in length resulting in a longer leg and a shorter leg, and the axis of rotation is inclined to the surface normal of the longer leg in the direction of the shorter leg.

9. The device according to claim 1, wherein the axis of rotation of the axial fan is inclined to a surface normal of the heat exchanger in a direction of an end region of the supply air channel.

10. The device according to claim 1, wherein the at least one supply air channel tapers in a wedge shape along the inlet surface of the heat exchanger.

11. The device according to claim 1, wherein the outflow housing forms an air intake chamber, axially offset from the impeller and from a motor of the axial fan that drives the impeller to rotate about the axis of rotation, which receives the conveyed air flow over an entire cross-section of the impeller and the motor and is penetrated by the axis of rotation, and wherein the outflow housing covers the impeller and the motor as a hood in a rear view thereof.

12. The device according to claim 1, wherein the axial fan is two axial fans, each of which is assigned an outflow housing which receives the air flow conveyed by the axial fans, respectively, wherein the housing outlet openings of the outflow housings feed into a common air outlet channel of the air discharge unit.

13. The device according to claim 1 further comprises an air inlet channel arranged upstream of the at least one supply air channel.

14. The device according to claim 1 further comprises an air outlet channel arranged downstream of the axial fan.

15. The device according to claim 1, wherein the air discharge unit has a silencer.

16. The device according to claim 15, wherein the silencer is configured as a splitter silencer which has a silencer housing, wherein, between two opposite side walls of the silencer housing, a plurality of spaced-apart baffles are arranged at a distance from the side walls, wherein silencer outflow cross-sections between the baffles, and between the baffles and the side walls, as a whole form the outflow cross-section defining the outlet speed of the air flow.

17. The device according to claim 1, wherein the air discharge unit for expanding the air flow has a first diffuser with an opening angle of a maximum of 8°, wherein an outlet cross-section of the first diffuser forms an outflow cross-section defining an outlet speed of the air flow.

18. The device according to claim 17, wherein the air discharge unit has a second diffuser, which is configured to form a free jet, and the second diffuser is arranged downstream of the first diffuser.

19. A heat pump with the device according to claim 1.

* * * * *